US011796107B2

(12) United States Patent
Marquez Carrillo

(10) Patent No.: US 11,796,107 B2
(45) Date of Patent: Oct. 24, 2023

(54) FLUID LINE QUICK CONNECTOR WITH CHECK VALVE

(71) Applicant: Norma U.S. Holding LLC, Auburn Hills, MI (US)

(72) Inventor: Jorge Alberto Marquez Carrillo, Nuevo Leon (MX)

(73) Assignee: Norma U.S. Holding LLC, Auburn Hills, MI (US)

( * ) Notice: Subject to any disclaimer, the term of this patent is extended or adjusted under 35 U.S.C. 154(b) by 0 days.

(21) Appl. No.: 17/380,507

(22) Filed: Jul. 20, 2021

(65) Prior Publication Data

US 2022/0018474 A1 Jan. 20, 2022

Related U.S. Application Data

(60) Provisional application No. 63/053,861, filed on Jul. 20, 2020.

(51) Int. Cl.
*F16L 37/38* (2006.01)
(52) U.S. Cl.
CPC ................................. *F16L 37/38* (2013.01)
(58) Field of Classification Search
CPC .... F16L 37/28; F16K 15/1402; F16K 15/148; F16K 15/023; F16K 15/021; F16K 15/02; F16K 15/06
See application file for complete search history.

(56) References Cited

U.S. PATENT DOCUMENTS

2009/0167018 A1\* 7/2009 Lien .................... F16L 37/0841
 285/308
2011/0293451 A1\* 12/2011 Hess ....................... F16L 37/38
 417/437
2013/0074964 A1 3/2013 Wu
2014/0102561 A1\* 4/2014 Wright .................... F16L 37/38
 137/528
2019/0281859 A1\* 9/2019 Bischel .................... A23G 9/28
2020/0378539 A1\* 12/2020 Ruopp .................... F16L 37/40

FOREIGN PATENT DOCUMENTS

| CN | 106855143 A | 6/2017 |
| DE | 102017106889 A1 \* | 10/2018 |
| JP | 2003021249 A | 1/2003 |
| KR | 101623471 B1 | 5/2016 |
| WO | WO2013078865 A1 | 6/2013 |

OTHER PUBLICATIONS

2022, DE102017016889 English machine translation from Espacenet (Year: 2022).\*
International Search Report and Written Opinion for International Application No. PCT/US2021/042327 dated Nov. 2, 2021 (8 pages).

\* cited by examiner

*Primary Examiner* — Hailey K. Do
(74) *Attorney, Agent, or Firm* — REISING ETHINGTON, P.C.

(57) ABSTRACT

A fluid line quick connector for joining fluid lines together, such as coolant fluid lines in electric vehicle automobile applications, among other possible applications. A check valve is incorporated into the fluid line quick connector in order to preclude unwanted backflow through a passage of the fluid line quick connector. The check valve has a rigid partition wall and a flexible diaphragm. The partition wall has one or more through-holes residing therein. The diaphragm closes the through-hole(s), and moves relative to the partition wall in order to open a portion or more of the through-hole(s).

14 Claims, 3 Drawing Sheets

FLUID LINE QUICK CONNECTOR WITH CHECK VALVE

CROSS-REFERENCE TO RELATED APPLICATION

This application claims the benefit of U.S. Provisional Patent Application No. 63/053,861, with a filing date of Jul. 20, 2020, the contents of which are hereby incorporated by reference in their entirety.

TECHNICAL FIELD

This disclosure relates generally to quick connectors used to join fluid lines together, and to check valves used with quick connectors and fluid lines.

BACKGROUND

Connectors, especially those with quick-connect functionality, are commonly used to join fluid lines together in vehicle applications. One example is coolant fluid lines in electric vehicle automobiles for management of temperature of the accompanying batteries. Still, other examples exist in automotive applications, as well as in non-automotive applications. Check valves are sometimes employed for use with the quick connectors and with the fluid lines in order to ensure that the fluid travels only in the direction it is intended to travel in, and to prevent fluid travel in the opposite and unintended direction. When used, check valves can be equipped between successive fluid lines, or can be equipped near the quick connectors themselves.

SUMMARY

In an embodiment, a fluid line quick connector may include a housing, a partition wall, and a diaphragm. The housing has a passage. The partition wall extends across the passage. One or more through-holes resides in the partition wall. The diaphragm is situated on a downstream side of the partition wall. The through-hole(s) is openable (i.e., can be opened) by fluid-flow travel through the through-hole(s) and urging of movement of the diaphragm downstream of the partition wall by the fluid-flow travel.

In an embodiment, a fluid line quick connector may include a housing, a partition wall, a diaphragm, an extension, and an opening. The housing has a passage. The partition wall is situated in the passage. The partition wall has one or more through-holes residing therein. The diaphragm is situated on a downstream side of the partition wall. The extension spans from the partition wall or spans from the diaphragm. The opening resides in the partition wall or resides in the diaphragm, whichever is the opposite component from which the extension spans. Receipt of the extension in the opening serves to movably (i.e., capable of moving) anchor the diaphragm to the partition wall. Surface-to-surface abutment between the partition wall and the diaphragm closes the through-hole(s). And axial separation between the partition wall and the diaphragm by way of the extension opens the through-hole(s).

In an embodiment, a fluid line quick connector may include a housing, a partition wall, a diaphragm, an extension, and an opening. The housing has a passage. The partition wall extends across the passage. The partition wall has one or more through-holes residing therein. The partition wall is a rigid structure. The diaphragm is situated on a downstream side of the partition wall. The diaphragm is a flexible structure. The extension spans from the partition wall or spans from the diaphragm. The opening resides in the partition wall or resides in the diaphragm, whichever is the opposite component from which the extension spans. Receipt of the extension in the opening serves to movably (i.e., capable of moving) anchor the diaphragm to the partition wall. The extension has a stalk portion and a flanged end portion. When the through-hole(s) is closed, a first clearance is established between confronting surfaces of the flanged end portion and the partition wall or the diaphragm. When the through-hole(s) is open, a second clearance is established between confronting surfaces of the partition wall and the diaphragm. And when the through-hole(s) is open, a third clearance is established between the diaphragm and an inside surface of the passage.

BRIEF DESCRIPTION OF THE DRAWINGS

Embodiments of the disclosure are described with reference to the appended drawings, in which.

DETAILED DESCRIPTION

With reference to the figures, an embodiment of a check valve 10 is presented that is incorporated and built into the design and construction of a fluid line quick connector (hereafter, quick connector) 12. The check valve 10 permits fluid-flow travel in an intended direction, and prevents fluid-flow travel in an unintended direction, precluding unwanted backflow. Unlike previously-known combinations of connectors and check valves, the check valve 10 and quick connector 12 have an elegant integration that makes the check valve 10 compatible for use with quick connectors of various types with minimal and, in certain instances, no modifications to the original design of the quick connectors themselves in order to accommodate the integration. Diverse quick connectors can be readily retrofitted with the check valve 10. Reshaping, resizing, and/or other alterations to an exterior of the quick connector's housing is minimized and, in some cases, altogether unnecessary. Packaging demands for the larger application—which can oftentimes be inflexible in automotive applications—are hence spared and not exacerbated with the use of the check valve 10. This description presents the check valve 10 and quick connector 12 in the context of automotive fluid lines, such as coolant fluid lines in electric vehicle automobiles, but the check valve 10 and quick connector 12 have broader application and are suitable for use in aircraft fluid lines, marine fluid lines, agricultural fluid lines, as well as other fluid lines. Furthermore, unless otherwise specified, the terms radially, axially, and circumferentially, and their grammatical variations refer to directions with respect to the generally circular shape of the check valve 10 and its components as illustrated in the figures. The terms downstream and upstream refer to directions with respect to the direction of intended fluid-flow travel through the quick connector 12.

Figure 1:
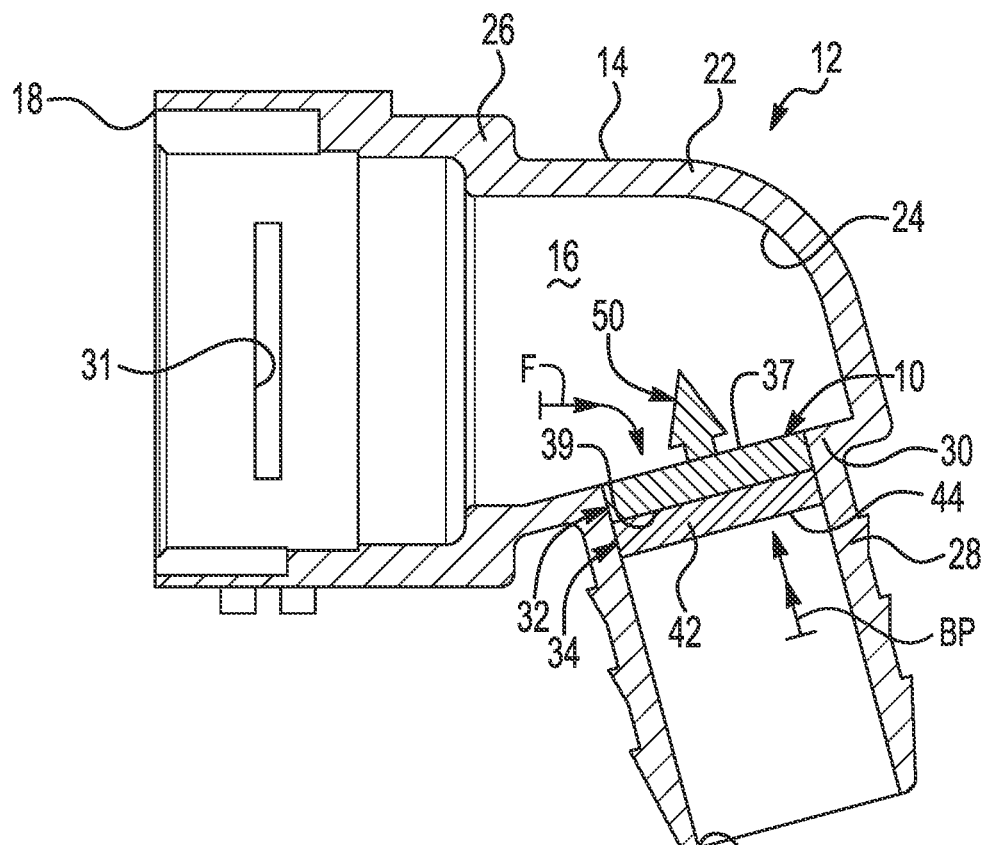
FIG. 1 is a sectional view of a fluid line quick connector and an embodiment of a check valve.

The quick connector 12 has quick-connect functionality for ready connect and disconnect actions with a spigot, and can connect with a rubber hose or a plastic tube, for example. The quick connector 12 can have various designs and constructions and components in different embodiments depending on, among other potential influences, the larger application in which it is installed, the design and construction of the accompanying spigot, hose, and/or tube, and the intended attributes of the connection and joints established. For instance, the quick connector 12 presented in FIG. 1 has an angled and elbow-shaped overall configuration, but could have an in-line configuration in other embodiments. With reference to FIG. 1, in this embodiment the quick connector 12 includes a main body or housing 14. The housing 14 can be composed of a plastic material. A main passage 16 spans through the housing 14 between a first open end 18 and a second open end 20. Fluid-flow travels through the main passage 16 from the first open end 18 and to the second open end 20, and in the direction of flow F. A main wall 22 of the housing 14 has an inside surface 24 that defines the main passage 16. The housing 14 has a primary section or portion 26 and a stem section or portion 28. The associated spigot is inserted in the quick connector 12 at the first open end 18, while the stem portion 28 receives the associated hose/tube. A step 30 resides at a transition between the primary portion 26 and the stem portion 28. Still, the quick connector 12 can include additional components such as a retainer spring to secure insertion of the spigot via an opening 31 established in the main wall 22, and can include one or more o-rings to establish a seal with the spigot once it is inserted.

In example applications of coolant fluid lines in electric vehicle automobiles, coolant fluid such as glycol is circulated to the accompanying batteries in order to manage their temperatures. Management of the battery temperatures in certain coolant systems can involve maintaining the temperatures within a targeted range for optimized battery performance. Coolant can be circulated to the batteries at different flow rates and times. It has been found that amid such circulation a back-pressure condition can arise among the coolant fluid lines which, when left unresolved, can consequently reverse the direction of coolant flow and hamper the desired cooling effect. Check valves are thus sometimes installed at particular places among the coolant fluid lines to prevent the reversal of coolant flow. Check valves have also been combined with connectors that are assembled with the coolant fluid lines. But past combinations of connectors and check valves have been observed to exhibit unwanted complexities and to include an unwelcome quantity of discrete components. Moreover, past combinations often had check valves designed uniquely for a particular connector, making the check valve largely incompatible with other connectors, absent an undue reconstruction. And past combinations commonly called for a specially designed connector housing to accommodate the check valve.

In certain embodiments, the check valve 10 resolves some or all of these previous shortcomings. The check valve 10 is installed at an interior of the quick connector 12 and within the main passage 16 of the housing 14. The check valve 10 is located in the stem portion 28 and at the step 30 in the embodiment of FIG. 1, but could have other locations in other embodiments. Fluid-flow travel is permitted in the direction of flow F via the check valve 10, and is prevented and blocked in an opposite direction. Accordingly, the check valve 10 is a one-way check valve. The check valve 10 can have various designs and constructions in different embodiments depending upon, among other possible factors, the intended attributes of the permitted and prevented fluid-flow. In the embodiment presented in the figures, the check valve 10 includes a total of two components: a partition wall 32 and a diaphragm 34. Still, the check valve 10 could include more and/or different components in other embodiments.

Figure 3:
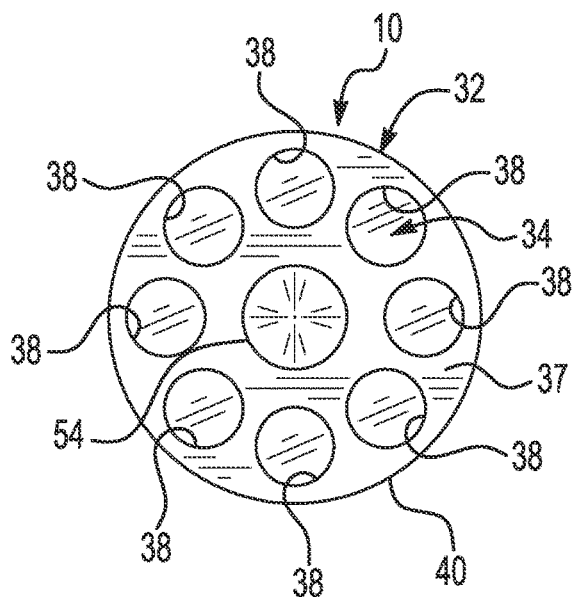
FIG. 3 is a front view of the check valve in the closed state.
Figure 5:
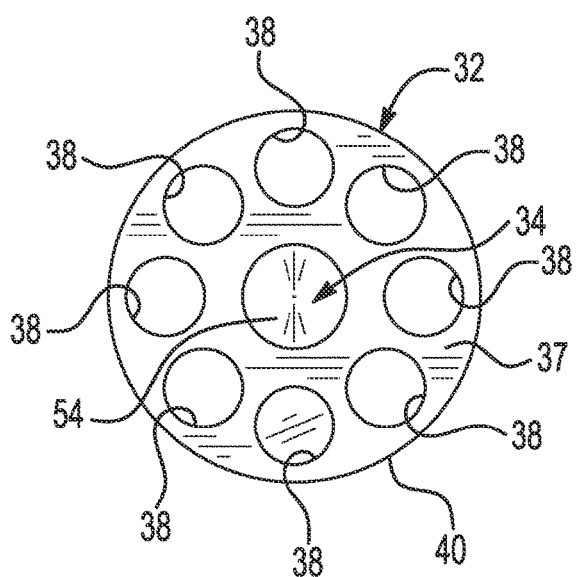
FIG. 5 is a front view of the check valve in the open state.
Figure 6:
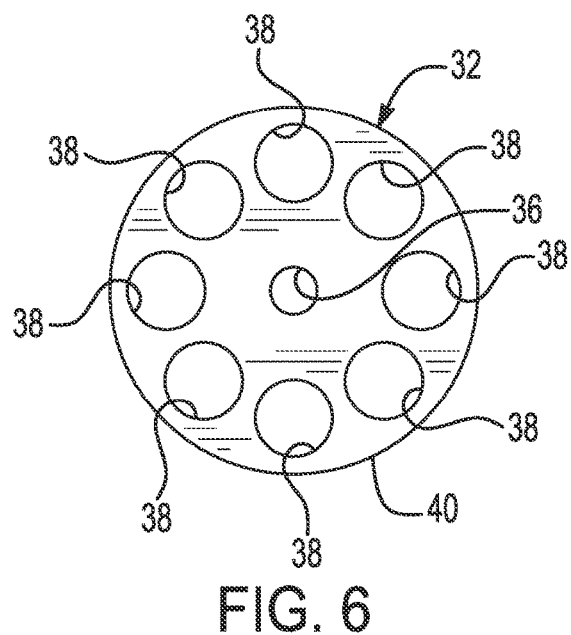
FIG. 6 is a front view of a partition wall of the check valve.

The partition wall 32 holds and carries the diaphragm 34 amid use of the check valve 10. The partition wall 32 is a rigid, one-piece structure that remains static when the check valve 10 functions to permit and prevent fluid-flow travel. The partition wall 32 has a disk shape to complement the shape of the main passage 16. It is fixed in place at its location in the main passage 16, and can be a unitary and monolithic construction of the housing 14, or can be a separate and distinct component that is inserted and secured in place in the main passage 16. The partition wall 32 can be composed of a plastic material. With reference to FIG. 1, the partition wall 32 extends across the main passage 16 and spans radially and wholly thereacross. Its extension lies generally transverse to the direction of flow F. With reference now to FIGS. 3, 5, and 6, an opening 36 resides in the partition wall 32 for receiving a component of the diaphragm 34. The opening 36 spans completely through the partition wall 32 from a first axially-facing surface 37 to a second axially-facing surface 39, and is located at a central region relative to the disk shape of the partition wall 32, as perhaps shown best in FIG. 6.

One or more through-holes 38 reside in the partition wall 32 in order to permit the passage of fluid-flow past the partition wall 32 when the check valve 10 is in its open state. The through-hole(s) 38 can have various quantities, locations, patterns, and shapes in different embodiments depending upon, among other possible factors, the desire in a particular application to maximize flow rate and minimize pressure drop across the partition wall 32. In the embodiment of the figures, there are multiple through-holes 38, eight in total. The eight through-holes 38 are spaced circumferentially around the partition wall 32 and are situated at a radially-outboard region of the partition wall 32 and radially-outboard with respect to the opening 36. Further, the through-holes 38 are situated radially-inboard relative to an outer periphery 40 of the partition wall 32. Each through-hole 38 spans completely through the partition wall 32 between the first and second axially-facing surfaces 37, 39. And each through-hole 38 in this embodiment is circular in shape. Still, in other embodiments there can be more or less than eight through-holes 38, the through-holes 38 can be located more radially-inboard or more radially-outboard than shown, and/or the through-holes 38 can be shaped as an oval, a triangle, a square, a diamond, or something else.

Figure 7:
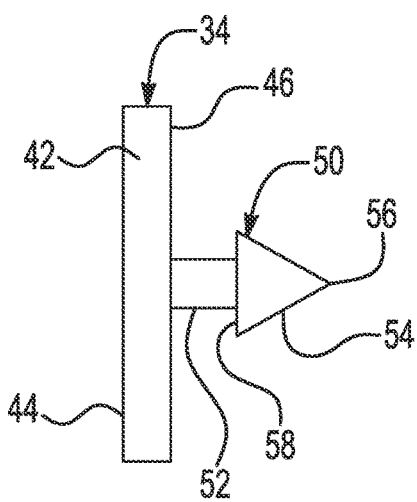
FIG. 7 is a side view of a diaphragm of the check valve.
Figure 8:
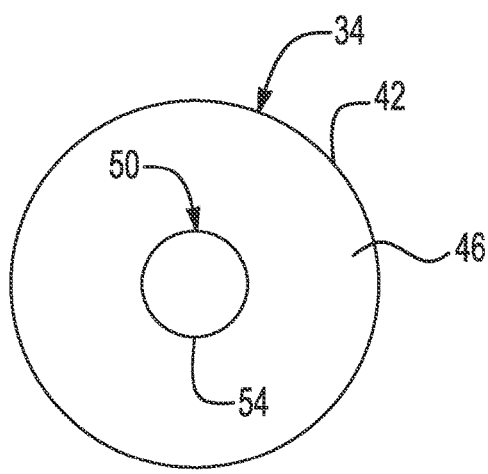
FIG. 8 is a front view of the diaphragm.
Figure 9:
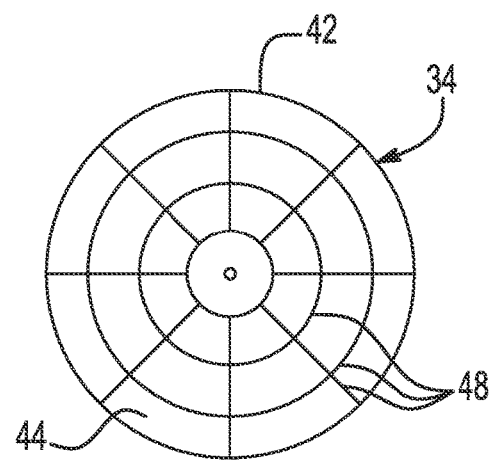
FIG. 9 is a rear view of the diaphragm.

The diaphragm 34 moves with respect to the partition wall 32 in order to bring the check valve 10 to its open and closed states amid use of the check valve 10. The diaphragm 34 is generally situated on a downstream side of the partition wall 32 relative to the direction of flow F. Referring now to FIGS. 7-9, the diaphragm 34 is a flexible, one-piece structure that slides and bends when prompted in response to fluid-flow travel through the through-holes 38. The diaphragm 34 can be composed of a rubber material. The diaphragm 34 has a main body 42 that is sized and shaped similar to the partition wall 32 in the embodiment shown, but could be sized and shaped in other ways in other embodiments to cover and close the through-holes 38 when the check valve 10 is in its closed state. Unlike the partition wall 32, the main body 42 has some degree of movement at its location with respect to the partition wall 32 and relative to the main passage 16. The main body 42 lacks openings or other voids in its structure in the embodiment here. It has a first axially-facing surface 44 and a second axially-facing surface 46. As depicted in FIG. 9, a web of ribs 48 are located on the first axially-facing surface 44 in order to provide a level of structural integrity in the main body 42.

An extension 50 depends axially from the main body 42 and is used to anchor the diaphragm 34 and the partition wall 32 together. The anchoring is carried out via engagement and movable insertion and reception between the extension 50 and the opening 36. The extension 50 spans from the second axially-facing surface 46, and is located at a central region of the main body 42 relative to the disk shape of the main body 42. The extension 50 can be a unitary and monolithic structure of the main body 42, or could be a separate and distinct component that is attached to the main body 42. The extension 50 can have various designs and constructions in different embodiments in order to carry out its anchoring to the opening 36. With particular reference to FIG. 7, in this embodiment the extension 50 has a stalk portion 52 and a flanged end portion 54. The stalk portion 52 extends immediately from the second axially-facing surface 46 in an axial direction. The stalk portion 52 has a uniform diameter across its axial extent. Its diameter can have a value that is slightly less than a diameter of the opening 36 so that the stalk portion 52 can slide axially back-and-forth in the opening 36 as prompted during use of the check valve 10. The flanged end portion 54 constitutes a free end of the extension 50. The flanged end portion 54 is shaped for initial insertion through the opening 36 and for subsequent retention against the partition wall 32. In the embodiment here, the flanged end portion 54 has a cone shape. It tapers to a pointed terminal end 56, and has a planar retention surface 58 opposite the terminal end 56. The pointed terminal end 56 and widening expanse emanating therefrom facilitates insertion of the flanged end portion 54 through the opening 36 to assemble and anchor the diaphragm 34 and the partition wall 32 to each other. The planar retention surface 58 constitutes the widest extent of the flanged end portion 54, and is wider than the widest extent of the stalk portion 52.

Figure 2:
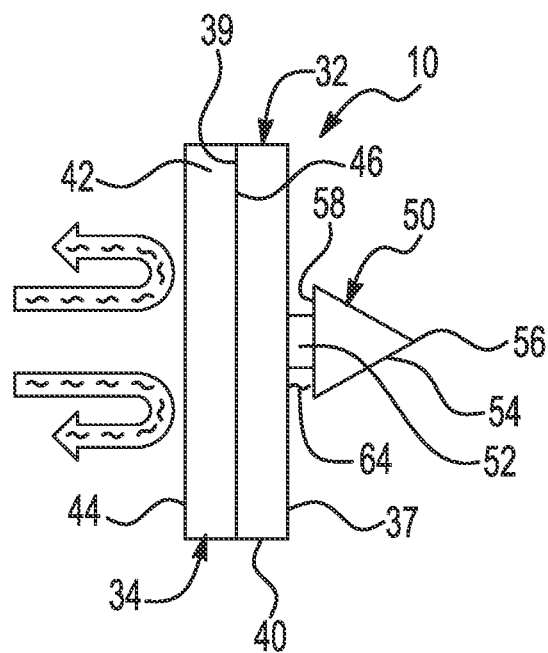
FIG. 2 is a side view of the check valve in isolation, the check valve presented in a closed state.
Figure 4:
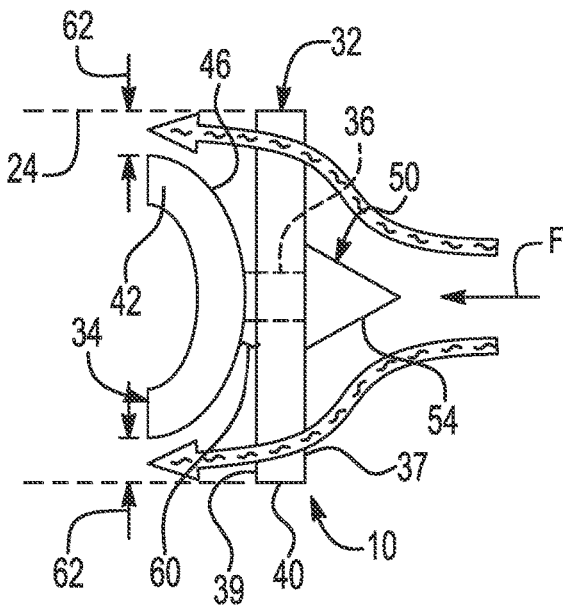
FIG. 4 is a side view of the check valve, the check valve presented in an open state.

In use, the partition wall 32 and diaphragm 34 work together to bring the check valve 10 to its open state and permit fluid-flow travel there-past, and to bring the check valve 10 to its closed state and prevent fluid-flow travel thereat. The open state is depicted in FIGS. 4 and 5, and the closed state is depicted in FIGS. 2 and 3. The open and closed states are prompted by the presence and direction of fluid-flow experienced inside of the main passage 16 and at the check valve 10. When fluid-flow travels in the direction of flow F, the check valve 10 can be brought to and maintained in the open state. The fluid-flow travel encounters the partition wall 32 on an upstream side thereof and passes through the through-holes 38. Pressure on the diaphragm 34 urges movement of the diaphragm 34 with respect to the partition wall 32. In the embodiment of the figures, the diaphragm 34 experiences at least two kinds of movements when the check valve 10 is in the midst of opening. The diaphragm 34 moves downstream and away from the partition wall 32, which itself does not move. Relative to the shape of the components, the movement here is in the axial direction. The stalk portion 52 slides in the opening 36, separating the main body 42 from the partition wall 32 and establishing a first clearance 60 (FIG. 4) between the confronting and opposing surfaces of the second axially-facing surface 39 of the partition wall 32 and the second axially-facing surface 46 of the main body 42. The first clearance 60 is an axial spacing between the second axially-facing surfaces 39, 46. Surface-to-surface abutment between the retention surface 58 and the first axially-facing surface 37 halts this movement and precludes outright detachment and further separation between the partition wall 32 and the diaphragm 34.

Further, the second kind of movement experienced by the diaphragm 34 in the midst of opening is bending movement. A radially-outboard region of the main body 42 bends in the downstream direction. The main body 42 is arced and curved as a result, as illustrated in FIG. 4. The flexibility of the main body 42 facilitates this movement. A second clearance 62 is then established between the main body 42 and the inside surface 24 of the main passage 16. The second clearance 62 spans circumferentially around the main body 42. The second clearance 62 is a radial spacing, and can be a ring-shaped spacing. Fluid-flow travels through the second clearance 62 when the check valve 10 is in the open state. Still, in certain embodiments, both movements of the diaphragm 34 need not necessarily occur amid opening, depending on the particular design and construction of the main body 42, and rather only one of the movements (i.e., downstream separation or bending) could occur to open the check valve 10.

Conversely, when a back-pressure condition arises at the quick connector 12, the check valve 10 can be brought to and maintained in the closed state. Back-pressure fluid-flow travels in a direction opposite to that of the direction of flow F, and is represented in FIG. 1 by the reference BP. With general reference now to FIGS. 2 and 3, the fluid-flow travel encounters the first axially-facing surface 44 of the main body 42. Pressure on the diaphragm 42 via the first axially-facing surface 44 urges movement of the diaphragm 34 with respect to the partition wall 32. If the check valve 10 was in its open state immediately prior to being prompted to close, then the movement to close the check valve 10 is the reverse of the movement to open it. The diaphragm 34 moves in the opposite axial direction toward the partition wall 32. The stalk portion 52 slides in the opening 36, bringing the main body 42 and the partition wall 32 together and closing the first clearance 60. The retention surface 58 and the first axially-facing surface 37 separate from each other, establishing a third clearance 64 (FIG. 2) between the confronting and opposing surfaces thereof. In addition, the previously arced and curved main body 42 is pushed to a planar configuration as illustrated in FIGS. 2 and 3. Surface-to-surface abutment between the second axially-facing surface 39 of the partition wall 32 and the second axially-facing surface 46 of the main body 42 serves to close the through-holes 38 and block fluid-flow travel therethrough from the direction opposite to that of the direction of flow F. The main body 42 wholly covers the through-holes 38.

Furthermore, because the check valve 10 in this embodiment includes two components of relatively uncomplicated designs and constructions—the partition wall 32 and the diaphragm 34—the check valve 10 can be adapted for use with quick connectors of various types with minimal and, in many cases, no modifications to the original design of the quick connectors themselves. For instance, the overall diameter of the partition wall 32 and of the diaphragm 34 could be increased or decreased for installation at an interior and at a passage of a differently-sized quick connector.

Still, in other embodiments the check valve 10 could have modified designs and constructions. For example, the extension 50 could extend from the partition wall 32 instead of from the diaphragm 34, and the diaphragm 34 could then have the opening 36 for reception of the extension 50.

Unlike the extension 50 shown in FIG. 1, the extension 50 extending from the partition wall 32 in this alternative embodiment would be directed in an opposite axial direction than that depicted. Moreover, the function of the extension 50 and opening 36 in this alternative embodiment would be substantially the same as described—namely, the diaphragm 34 would move with respect to the partition wall 32 and about the extension 50 when the check valve 10 is brought to and from its open and closed states.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An elbow-shaped fluid line quick connector, comprising:
    a housing having a passage and an opening for reception of a retainer spring of the elbow-shaped fluid line quick connector, said housing having a primary portion and a stem portion, said housing being angled adjacent a transition between said primary portion and said stem portion for establishment of an elbow-shape of the elbow-shaped fluid line quick connector, said passage spanning through said primary and stem portions, a step residing at said transition between said primary portion and said stem portion, said opening located at said primary portion;
    a partition wall extending across said passage, at least one through-hole residing in said partition wall, said partition wall being located in said stem portion and at said step; and
    a diaphragm situated on a downstream side of said partition wall, said diaphragm being located in said stem portion and at said step, said at least one through-hole closed by said diaphragm, and said at least one through-hole openable by fluid-flow travel through said at least one through-hole and urging of movement of said diaphragm downstream of said partition wall by the fluid-flow travel;
    wherein said partition wall has an opening residing therein and said diaphragm has an extension, said diaphragm being anchored to said partition wall via an engagement between said extension and said opening, wherein said extension moves in said opening in an axial direction when said at least one through-hole is opened and when said diaphragm is urged to move downstream of said partition wall by the fluid-flow travel, and wherein said extension moves in said opening in a second, opposite axial direction when said at least one through-hole is closed by said diaphragm.

2. The elbow-shaped fluid line quick connector as set forth in claim 1, wherein said partition wall remains static when said diaphragm is urged to move downstream of said partition wall by the fluid-flow travel.

3. The elbow-shaped fluid line quick connector as set forth in claim 1, wherein said partition wall is a rigid structure and said diaphragm is a flexible structure.

4. The elbow-shaped fluid line quick connector as set forth in claim 1, wherein said at least one through-hole is a plurality of through-holes residing in said partition wall, said plurality of through-holes located in said partition wall at a radially-outboard region of said partition wall.

5. The elbow-shaped fluid line quick connector as set forth in claim 1, wherein said opening and said extension are located at respective central regions of said partition wall and said diaphragm.

6. The elbow-shaped fluid line quick connector as set forth in claim 1, wherein urging of movement of said diaphragm and ensuing opening of said at least one through-hole involves movement of said diaphragm away from said partition wall in a downstream direction and bending movement of said diaphragm.

7. The elbow-shaped fluid line quick connector as set forth in claim 1, wherein said partition wall and said diaphragm together constitute a check valve of the elbow-shaped fluid line quick connector, said check valve lacking additional distinct components other than said partition wall and said diaphragm.

8. The elbow-shaped fluid line quick connector as set forth in claim 1, wherein surface-to-surface abutment between a first axially-facing surface of said diaphragm and a second axially-facing surface of said partition wall closes said at least one through-hole.

9. The elbow-shaped fluid line quick connector as set forth in claim 8, wherein a clearance resides between confronting surfaces of said diaphragm and said partition wall when said at least one through-hole is opened by fluid-flow travel through said at least one through-hole and said diaphragm is urged to move downstream of said partition wall by the fluid-flow travel.

10. An elbow-shaped fluid line quick connector, comprising:
    a housing having a passage, said passage spanning through said housing between a first open end and a second open end, fluid-flow traveling through said passage from said first open end and to said second open end, said housing having a stem portion, said second open end established at said stem portion, said stem portion receiving a hose or a tube upon installation, said housing being angled upstream of said stem portion for establishment of an elbow-shape of the elbow-shaped fluid line quick connector;
    a partition wall situated in said passage, said partition wall having at least one through-hole residing therein, said partition wall being located within an interior of said housing and being located downstream of said first open end and upstream of said second open end, said partition wall being located at said stem portion;
    a diaphragm situated on a downstream side of said partition wall, said diaphragm being located upstream of said second open end and at said stem portion; and
    an extension spanning from one of said partition wall or said diaphragm, and an opening residing in the other of said partition wall or said diaphragm, receipt of said extension in said opening movably anchoring said diaphragm to said partition wall;

wherein surface-to-surface abutment between a first axially-facing surface of said partition wall and a second axially-facing surface of said diaphragm closes said at least one through-hole, and axial separation between said partition wall and said diaphragm via said extension opens said at least one through-hole, and wherein said diaphragm exhibits a planar configuration when said diaphragm closes said at least one through-hole.

11. The elbow-shaped fluid line quick connector as set forth in claim 10, wherein said extension has a stalk portion and a flanged end portion, said stalk portion is received in said opening, and wherein, when said at least one through-hole is closed, a first clearance is established between confronting surfaces of said flanged end portion and said partition wall or said diaphragm, and wherein, when said at least one through-hole is open, a second clearance is established between confronting surfaces of said partition wall or said diaphragm and the other of said partition wall or said diaphragm.

12. The elbow-shaped fluid line quick connector as set forth in claim 10, wherein, when said at least one through-hole is open, a clearance is established between a radially-outboard region of said diaphragm and an inside surface of said passage, said clearance effected by bending movement of said diaphragm in response to fluid-flow travel through said at least one through-hole.

13. An elbow-shaped fluid line quick connector, comprising:
a housing having a passage and an opening for reception of a retainer spring of the elbow-shaped fluid line quick connector, said housing having a primary portion and a stem portion, said passage spanning through said primary and stem portions, said housing being angled adjacent a transition between said primary portion and said stem portion for establishment of an elbow-shape of the elbow-shaped fluid line quick connector;

a partition wall extending across said passage, at least one through-hole residing in said partition wall, said partition wall being a rigid structure, said partition wall being located within an interior of said housing and being located at said stem portion;

a diaphragm situated on a downstream side of said partition wall, said diaphragm being a flexible structure, said diaphragm being located within an interior of said housing and being located at said stem portion; and an extension spanning from one of said partition wall or said diaphragm, and an opening residing in the other of said partition wall or said diaphragm, receipt of said extension in said opening movably anchoring said diaphragm to said partition wall, said extension having a stalk portion and a flanged end portion;

wherein, when said at least one through-hole is closed, a first clearance is established between confronting surfaces of said flanged end portion and said partition wall or said diaphragm, and wherein, when said at least one through-hole is open, said first clearance is closed and a second clearance is established between confronting surfaces of said partition wall and said diaphragm, and a third clearance is established between said diaphragm and an inside surface of said passage.

14. The elbow-shaped fluid line quick connector as set forth in claim 1, wherein said diaphragm exhibits a planar configuration when said at least one through-hole is closed by said diaphragm.

\* \* \* \* \*